(12) United States Patent
Parkinson et al.

(10) Patent No.: US 10,113,810 B2
(45) Date of Patent: Oct. 30, 2018

(54) THERMAL ENERGY STORAGE APPARATUS

(75) Inventors: Neil Parkinson, North Brighton (AU);
Patrick Joseph Glynn, Kuraby (AU)

(73) Assignee: Climate Change Technologies Pty Ltd (AU)

( * ) Notice: Subject to any disclaimer, the term of this patent is extended or adjusted under 35 U.S.C. 154(b) by 775 days.

(21) Appl. No.: 14/237,759

(22) PCT Filed: Sep. 9, 2012

(86) PCT No.: PCT/AU2012/000938
§ 371 (c)(1),
(2), (4) Date: Nov. 5, 2014

(87) PCT Pub. No.: WO2013/020176
PCT Pub. Date: Feb. 14, 2013

(65) Prior Publication Data
US 2015/0053367 A1    Feb. 26, 2015

Related U.S. Application Data

(60) Provisional application No. 61/521,487, filed on Aug. 9, 2011.

(51) Int. Cl.
*F28D 17/00* (2006.01)
*F28D 20/02* (2006.01)
(Continued)

(52) U.S. Cl.
CPC ............ *F28D 20/025* (2013.01); *B23P 15/26* (2013.01); *F24S 60/00* (2018.05);
(Continued)

(58) Field of Classification Search
CPC .... F28D 20/025; F28D 20/0056; F28D 20/02;
F24J 2/34; F28F 7/02
See application file for complete search history.

(56) References Cited

U.S. PATENT DOCUMENTS 3,370,418 A * 2/1968 Kelly .................... F02G 1/043
                                                          60/519
3,548,930 A * 12/1970 Byrd ........................ B64G 1/50
                                                       165/104.26
(Continued)

FOREIGN PATENT DOCUMENTS

DE        202011000830 U1    8/2011
WO      WO 2011/017767 A1    2/2011
WO      WO 2011058383 A2 *   5/2011   ............ F24D 11/003

OTHER PUBLICATIONS

Australian Patent Application No. 2012292959, Patent Examiner Report No. 1 dated Dec. 12, 2014; 3 pages.
(Continued)

*Primary Examiner* — Len Tran
*Assistant Examiner* — Gordon Jones
(74) *Attorney, Agent, or Firm* — Swanson & Bratschun, L.L.C.

(57) ABSTRACT

A thermal energy storage apparatus, including: a block of a heat-absorbing material, and a plurality of heat storage elements, the heat storage elements including a phase change material stored in a containment vessel; wherein each heat storage element is in thermal contact with the block of heat-absorbing material.

11 Claims, 7 Drawing Sheets

(51) Int. Cl.
    *F28F 7/02*     (2006.01)
    *F28D 20/00*     (2006.01)
    *B23P 15/26*     (2006.01)
    *F24S 60/00*     (2018.01)

(52) U.S. Cl.
    CPC ......... *F28D 20/0056* (2013.01); *F28D 20/02* (2013.01); *F28F 7/02* (2013.01); *F02G 2254/40* (2013.01); *Y02E 10/40* (2013.01); *Y02E 60/142* (2013.01); *Y02E 60/145* (2013.01); *Y10T 29/4935* (2015.01)

(56) References Cited

U.S. PATENT DOCUMENTS

| | | | | |
|---|---|---|---|---|
| 4,830,092 | A * | 5/1989 | Lee .................. | F02G 1/0445 126/400 |
| 5,694,515 | A * | 12/1997 | Goswami .......... | F24H 7/0433 137/341 |
| 7,524,385 | B2 * | 4/2009 | McGrath ............ | B22D 27/02 148/558 |
| 2008/0276616 | A1 * | 11/2008 | Flynn ................. | F01K 3/12 60/641.15 |
| 2009/0199998 | A1 | 8/2009 | Shimozono | |
| 2011/0120131 | A1 | 5/2011 | Ostlund | |
| 2011/0199177 | A1 * | 8/2011 | Lehto ................ | B81B 3/0024 337/306 |
| 2012/0312292 | A1 * | 12/2012 | Bahl .................. | F24D 3/148 126/400 |

OTHER PUBLICATIONS

Australian Patent Application No. 2012292959, Patent Examiner Report No. 1 dated Dec. 10, 2015; 3 pages.
Australian Patent Application No. 2012292959, Notice of Acceptance dated Jan. 30, 2016; 2 pages.
EP12821890.6 European Extended Search Report dated Oct. 26, 2015; 8 pages.
International Search Report prepared by the Australian Patent Office as International Searching Authority for PCT International Patent Application No. PCT/AU2012/000938, dated Oct. 29, 2012, 6 pages.

* cited by examiner

THERMAL ENERGY STORAGE APPARATUS

CROSS REFERENCE TO RELATED APPLICATION

This application is a 35 U.S.C. § 371 national phase application of PCT/AU2012/000938 (WO 2013/020176 A8), filed on Aug. 9, 2012, entitled "Thermal Energy Storage Apparatus," which application claims the priority from U.S. Provisional Application No. 61/521,487, filed Aug. 9, 2011, which is incorporated herein by reference in its entirety.

FIELD OF THE INVENTION

The present invention relates to a thermal energy storage apparatus.

BACKGROUND OF THE INVENTION

There has been a push in recent years to move away from fossil fuels as an energy source. The move towards what are generally characterised as cleaner fuel sources has seen significant development in the use of solar or wind energy as a means of providing usable forms of energy.

By its very nature, solar energy's biggest pitfall is the fact that at certain times of the day, the sun is unable to provide the necessary flux of photons to various devices that utilise solar energy. Similarly, wind turbines and the like are only effective when there is sufficient wind strength to drive them.

Interrupted or inconsistent supply of energy from a source makes it, in many instances, unreliable and also uneconomical.

In addition, at certain times, the sun's rays can be so excessive that the resultant heat and energy are dissipated as over-supply, rather than being usable by a solar-powered device.

A previous attempt to address the above difficulties used a silicon metalloid material as a means of storing thermal energy inside the material for use at a later time, for example, when solar input was no longer available, such as during the evenings or times of inclement weather. During peak solar activity the silicon metalloid material would absorb thermal energy as it underwent a phase change from a solid to a liquid.

Silicon metalloid material is characterised in part by the property that on undergoing a phase change from liquid to solid, there is an expansion of the material rather than contraction as would be expected for most other materials.

The thermal energy stored within the silicon metalloid material could be converted into electrical and/or mechanical action through electrical devices such as a Stirling engine and so forth, thus providing a source of power at times when solar activity was not available.

A disadvantage of silicon metalloid material is that it requires significant, care and understanding of its physical transformation during its expansion and contraction as it absorbs and releases thermal energy during phase changes. The expansion and contraction of the silicon metalloid material creates significant build-up of pressure on an enclosure in which it is placed. For example, if silicon metalloid material in the form of ingots is placed directly in contact with a refractory heat-absorbing material such as graphite, the metalloid would be absorbed by the graphite on undergoing a phase change to its liquid form. If the silicon metalloid is stored in a separate enclosure before being inserted into the refractory material, the continual pressure build-up and collapse of the silicon metalloid ingots as they undergo phase changes can result in fissuring of the enclosure.

If the ingots are stored within separate enclosures there would also be a need for the enclosure of the silicon metalloid ingots to efficiently transport heat, released during phase change of the silicon metalloid material, to the surrounding graphite.

PCT Application PCT/AU2010/001035 (published as WO 2011/017767), the contents of which are hereby incorporated in their entirety by reference, sought to address these problems by providing an enclosure in the form of an elongate canister formed of ceramics, the elongate canister including a pressure dispersion punt and a series of grooves in one of its ends, the series of grooves acting as a heat sink. In the thermal energy storage apparatus described in PCT/AU2010/001035, a series of such canisters are used to store silicon metalloid, and are packed in interleaved arrangement with a series of sintered graphite rods. It has been found, though, that in such an arrangement the canisters are prone to cracking, particularly in the region of the grooves.

It would be desirable to overcome or alleviate the above mentioned difficulties, or at least provide a useful alternative.

SUMMARY OF THE INVENTION

In accordance with one aspect of the present invention, there is provided a thermal energy storage apparatus, including:
   a block of a heat-absorbing material, and
   a plurality of heat storage elements, the heat storage elements including a phase change material stored in a containment vessel;
   wherein each heat storage element is in thermal contact with the block of heat-absorbing material.

In one embodiment, the block of heat-absorbing material includes a heat storage region having a first plurality of holes formed therein, the heat storage elements being seated in respective ones of said holes.

The heat-absorbing material may be a machinable material. In one embodiment, the heat-absorbing material is sintered graphite.

In one example of the invention, the holes are formed with predetermined intervals therebetween. The predetermined intervals may be chosen to optimise heat transport in the heat storage region.

The thermal energy storage apparatus may further include one or more heating elements in thermal contact with the heat storage region. The one or more heating elements may be seated in a second plurality of holes in the heat storage region.

Preferably, the heating elements are electric heating elements. The heating elements may be individually controllable to supply different amounts of heat to different areas of the heat storage region. The apparatus may further comprise one or more temperature sensors associated with each of the different areas of the heat storage region.

The apparatus may further comprise means for extracting heat from the heat storage elements, including for example a closed-cycle heat engine associated with the block of heat-absorbing material. The closed-cycle heat engine may be a Carnot cycle heat engine.

As used herein, a Carnot cycle heat engine refers to any closed-cycle heat engine which operates according to expansion and compression of a working gas. Examples of Carnot cycle heat engines include Stirling engines and Brayton engines.

In one example, the closed-cycle heat engine is a Stirling engine which is coupled to the heat storage region via a wick.

A preferred phase change material for use with embodiments of the invention includes silicon metalloid or a eutectic, hypereutectic or hypoeutectic silicon composition.

In another aspect, the present invention provides a containment vessel for a phase change material, including:
 a substantially cylindrical sidewall, a first end, and a second end;
 wherein the sidewall has a thickness which increases along its length from the first end to the second end,
 such that, on undergoing a phase change, the phase change material preferentially expands in the direction of the first end.

The sidewall preferably includes silicon carbide. Preferably, the sidewall is formed from particles having a particle size distribution spanning the range from about 8 US Mesh to −200 US Mesh. In preferred embodiments, the sidewall includes not less than 90% silicon carbide.

Embodiments of the containment vessel may advantageously be used with embodiments of the thermal energy storage apparatus as described herein.

In yet another aspect, the present invention provides a method of fabricating a containment vessel for a phase change material, the containment vessel having a body including silicon carbide, the method including:
 combining particles of silicon carbide with a binder; and
 heating the particles in a kiln according to a kiln schedule including steps of predetermined duration and temperature;
 wherein the predetermined duration is sufficient to form bonds between the particles throughout the body of the containment vessel.

In a further aspect, the present invention provides a method of storing thermal energy, including:
 providing a block of a heat-absorbing material; and
 placing a plurality of heat storage elements in thermal contact with the block;
 wherein the heat storage elements include a phase change material stored in a containment vessel.

The phase change material may include silicon metalloid or a eutectic, hypereutectic or hypoeutectic silicon composition. The containment vessel may comprise silicon carbide.

Preferably, the method includes embedding the heat storage elements in the block. For example, the method may include providing a heat storage region by forming a plurality of holes in the heat-absorbing material to receive one or more of the heat storage elements. A plurality of heating elements may be provided in the heat storage region.

In one embodiment, the heating elements are individually controllable to supply different amounts of heat to different areas of the heat storage region.

In one example, the method further includes maintaining a melt fraction of the phase change material between 1% and 99%.

BRIEF DESCRIPTION OF THE DRAWINGS

Preferred embodiments of the invention will now be described, by way of non-limiting example only, with reference to the accompanying drawings in which.

DETAILED DESCRIPTION OF PREFERRED EMBODIMENTS

Figure 1:
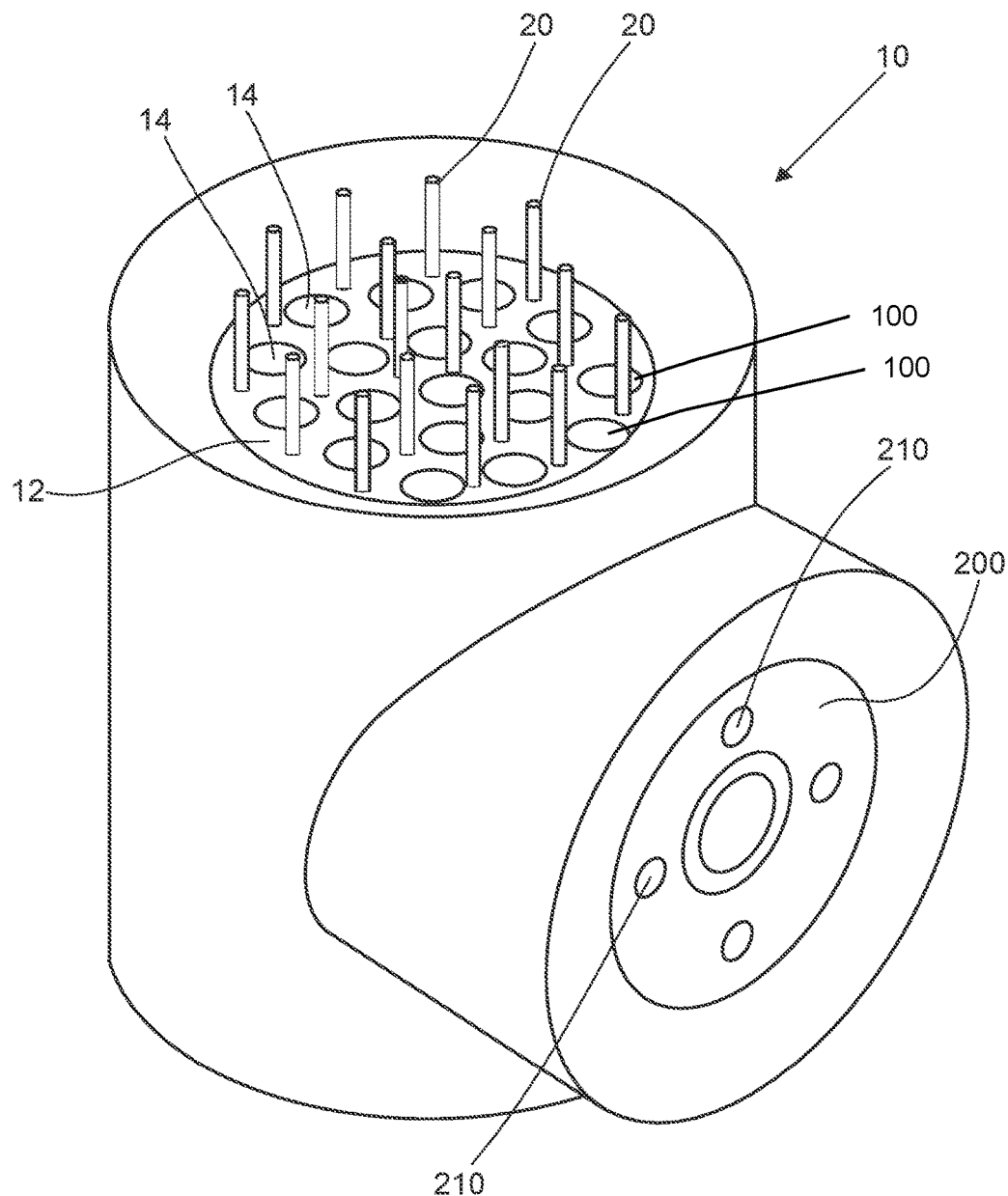
FIG. 1 shows one embodiment of a thermal energy storage apparatus.

Referring initially to FIG. 1, there is shown a thermal energy storage apparatus 10 including a block 12 of a heat-absorbing material. The block 12 is a contiguous block of heat-absorbing material having a plurality of holes 14 formed therein.

As used herein, the term "contiguous" refers to a single mass of material, whether solid or porous, in which any two points within the mass may be joined by a continuous path.

One or more heat storage elements 100 is seated within each of the holes 14, and each heat storage element 100 is in thermal contact with the block 12 of heat-absorbing material. The region of the block 12 containing the heat storage elements 100 will be referred to herein as a heat storage region.

Each heat storage element 100 includes a phase change material, in this case silicon metalloid, stored in a containment vessel. The containment vessels preferably form an interference fit within the holes 14.

Silicon metalloid has a latent heat storage capacity of approximately 497 W/kg at a temperature of 1410° C. In some circumstances it may be advantageous to employ, instead of silicon metalloid, a eutectic (or hypoeutectic or hypereutectic) silicon composition, which has a lower heat capacity but also a lower phase transition temperature. For example, a eutectic Al—Si alloy having an Al:Si ratio of 1:12 has a much lower transition temperature of 580° C., whilst still having a relatively large storage capacity of approximately 200 W/kg.

The heat-absorbing material is a machinable material, in particular sintered graphite, which may include a binder or other material impregnated therein. The holes 14 are formed in the block 12 by precision boring using techniques known in the art. The relative placement of the holes 14 is chosen in order to optimise heat transport within the block 12. The spacings between holes 14 may be optimised, having regard to the coefficients of thermal expansion of the sintered graphite and the heat storage elements, by methods known in the art. For example, the thermal transport properties of the block 12 in the heat storage region may be calculated using finite element methods, such as those incorporated in the multiphysics simulation modules provided in the ANSYS modelling software (ANSYS, Inc., Canonsburg, Pa.).

While sintered graphite is used in the presently described embodiments, it will be appreciated by the skilled person that other heat-absorbing materials will also be suitable, provided they have suitably high thermal conductivity and can be machined to accommodate the containment vessels.

It would of course be possible to allow the block 12 of heat-absorbing material to be heated directly by solar energy, for example by providing one or more solar concentrators to focus sunlight onto the block 12 at one or more locations. However, providing electric heating elements 20 at predetermined locations adjacent to the heat storage elements affords greater control over heating of the block 12.

Electric heating elements 20 are received in a second plurality of holes in the block 12, preferably forming an interference fit within respective ones of the second plurality of holes. The heating elements 20 are placed in gaps between adjacent holes 14. The second plurality of holes is also formed by precision boring.

It has been found that installing the heat storage elements in a single block of heat absorbing material, for example via precision-bored holes as described above, avoids the fracturing problems associated with previous approaches. In particular, a block structure is not subject to the shifting, during the heating and cooling phases, which is experienced by the graphite rods and associated containment vessels in the arrangement described in PCT/AU2010/001035. It is thought that this shifting produces stresses on the containment vessels, resulting in fracturing. The shifting also results in poorer heat transport properties than are obtainable with the presently described embodiment since it allows air gaps to develop between the heat storage elements and the surrounding graphite.

In operation of the thermal energy storage apparatus 10, electric current is supplied to the electric heating elements 20 by an external energy source. For example, the current may be a DC current from a photovoltaic array or an AC current from a wind turbine. As current passes through the heating elements 20, resistive heating of the surrounding graphite results. Heat is then transported to the phase change material of the heat storage elements via the walls of the containment vessels, which are in thermal contact with the graphite block. The silicon metalloid (or eutectic silicon composition, for example) absorbs sensible heat until its temperature reaches melting temperature, at which point further heat input to the silicon metalloid is stored as latent heat of fusion. When the external energy source (solar or wind) is no longer available, or drops below the level required to maintain the core temperature of the heating elements above the melting temperature, the silicon metalloid solidifies. The stored heat is then released to the surrounding graphite.

The heating elements 20 are preferably formed of silicon carbide, and may be coupled to a current source in conventional fashion, for example by copper cabling.

In order to extract heat to perform mechanical and/or electrical work, the apparatus 10 may be coupled to a Carnot cycle heat engine, such as a Stirling engine or a Brayton engine, via a wick 200 which is in thermal contact with the block 12. When the heat storage region is at a higher temperature than the head of the heat engine, heat is transported from the heat storage region by thermal conduction through the wick 200.

Figure 4:
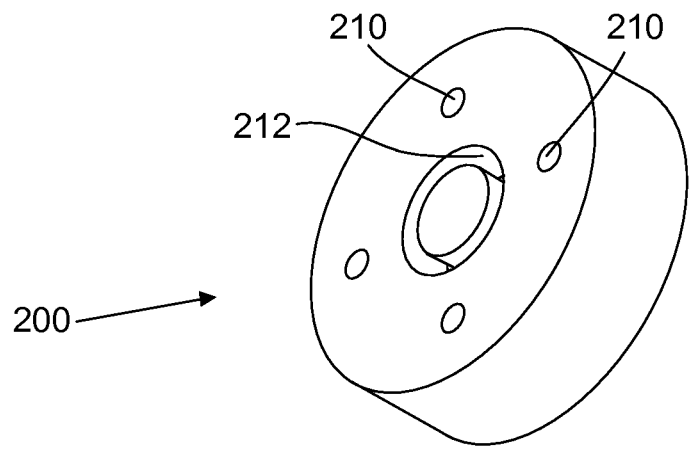
FIG. 4 shows a thermal wick for use with the thermal storage apparatus of FIG. 1.
Figure 5:
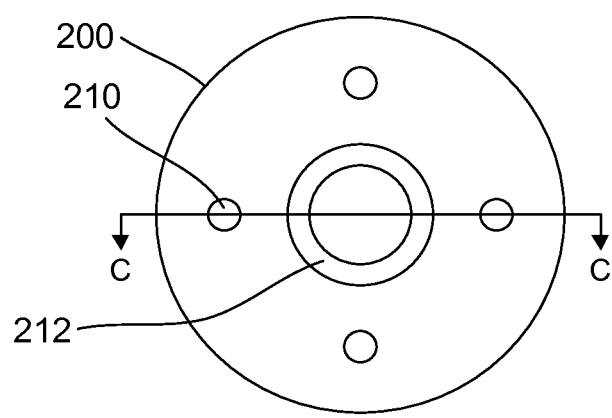
FIG. 5 is a front plan view of the wick of FIG. 4.
Figure 6:
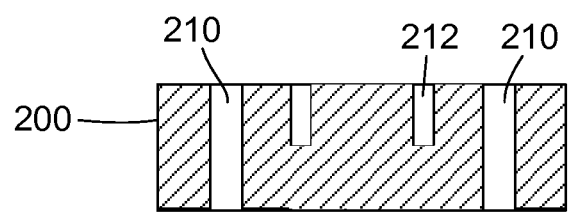
FIG. 6 is a cross-section through the line C-C of FIG. 5.

The wick 200, as shown more particularly in FIGS. 4 to 6, includes a plurality of through-holes 210 and a blind bore 212. These are provided to allow positive location of corresponding protrusions on the head of the Stirling engine to mechanically couple the head and the wick, and to ensure proper thermal contact between the Stirling engine and the wick 200 (and consequently the block 12).

The wick 200 is preferably formed of the same material as the block 12, or at least of a material which has the same or a very similar thermal conductivity to the material of the block 12. In the presently described embodiment, the wick 200 is fabricated from a machinable sintered graphite which may be of the same grade as the sintered graphite of the block 12.

Although the wick 200 is shown as a separate element in FIGS. 1 and 4 to 6, it will be appreciated that the location apertures 210 and 212 may be machined directly into a surface of the block 12 in situ. A separate wick 200 may in some circumstances be advantageous in providing a system with an increased degree of modularity.

The heating elements 20 may be individually controllable to supply different amounts of heat to different areas of the contiguous region of material 12. The different areas may each have one or more temperature sensors associated therewith. Temperature readings from each sensor may be communicated to a control system (not shown), and the readings used by the control system to adjust the electric current flowing to the respective heating elements 20, and thus the degree of heating. For example, if the temperature readings indicate that some areas of the contiguous region 12 are at temperatures well above the phase transition temperature of the silicon metalloid (or other phase change material) while others are well below, the current flowing to the respective areas can be adjusted accordingly so that each area has a temperature just above the phase transition temperature. This provides more efficient energy storage by heat storage elements associated with the respective areas.

Figure 2:
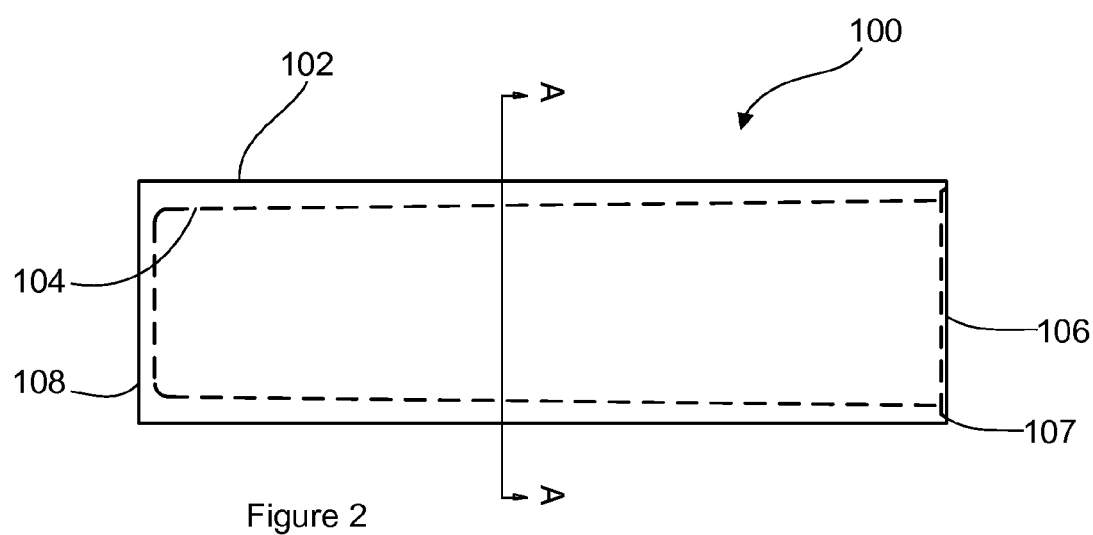
FIG. 2 is a cross-section through a containment vessel for use with the thermal energy storage apparatus of FIG. 1.
Figure 3:
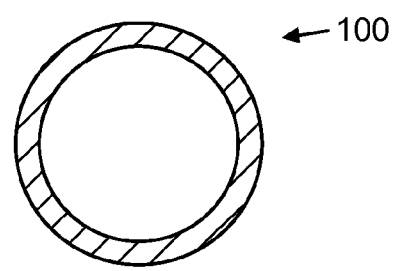
FIG. 3 is a cross-section through the line A-A of FIG. 2.

Referring now to FIGS. 2 and 3, there is shown a containment vessel 100 having a substantially cylindrical sidewall, with a cylindrical outer surface 102 and a tapered inner surface 104. The containment vessel 100 may be sealed by a lid 106, for example using a refractory cement. The inner surface 104 tapers inwardly from a first end 107 to a second end 108 of the containment vessel 100, such that the sidewall increases in thickness along its length from the first end 107 to the second end 108.

When a phase change material is stored in the containment vessel 100 and expands on undergoing a phase change from liquid to solid (or vice versa), the material will preferentially expand in the direction of the first end 107 due to the relatively greater thickness of the sidewall at the second end 108.

Containment vessels 100 fabricated from silicon carbide may be used to store silicon metalloid or eutectic silicon compositions, thereby to act as a heat storage element suitable for use with the thermal energy storage apparatus described above. Suitable silicon carbide compositions, and methods for fabricating the vessels 100, will be described below.

We have found that a taper angle substantially in the range from about 1.2 degrees to 3.2 degrees, more preferably from 1.33 degrees to 2.92 degrees, is suitable for containment vessels fabricated from silicon carbide and used to hold silicon metalloid or eutectic (or hypereutectic or hypoeutectic) silicon compositions.

Figure 7:
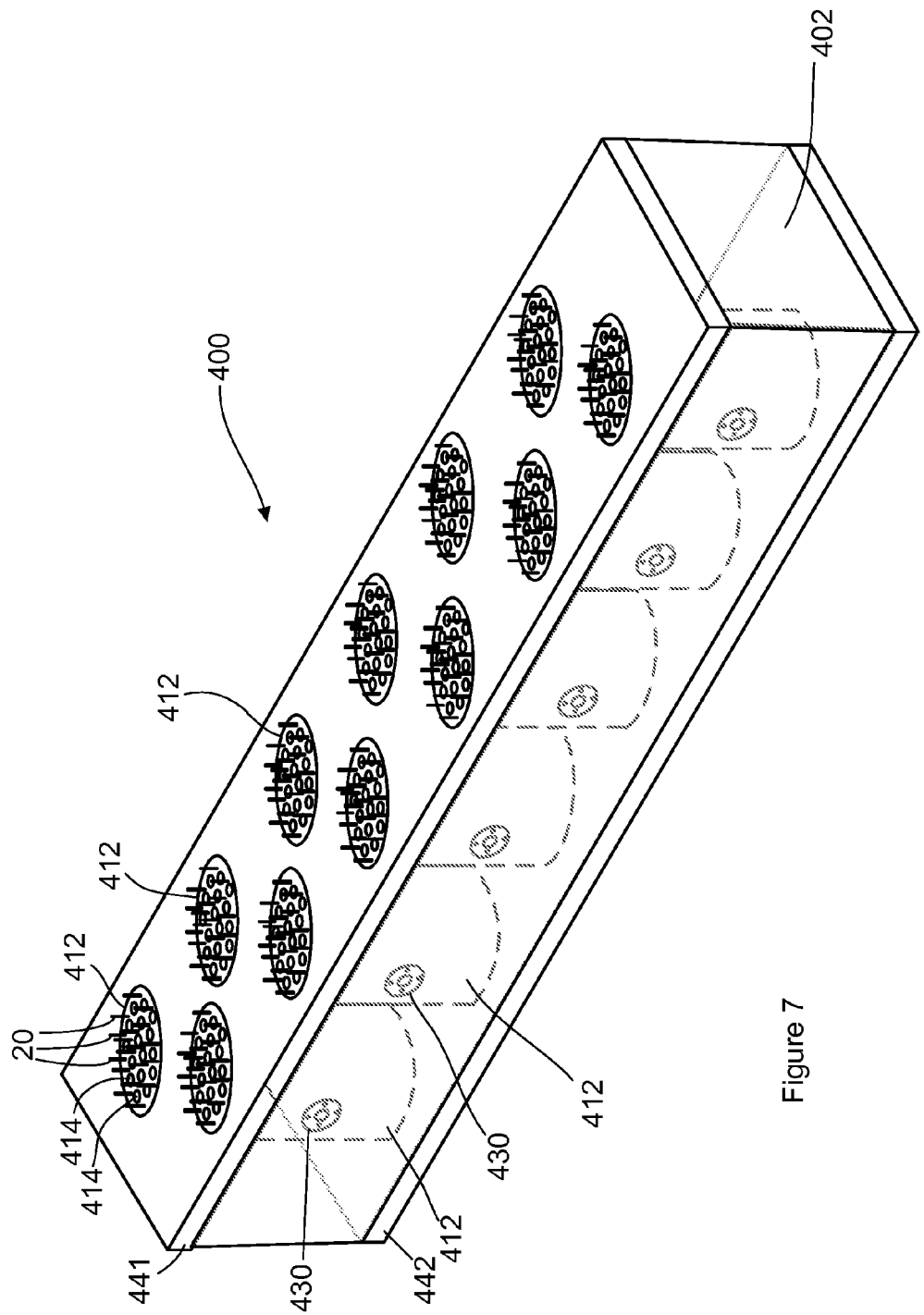
FIG. 7 shows an alternative thermal energy storage apparatus.
Figure 8:
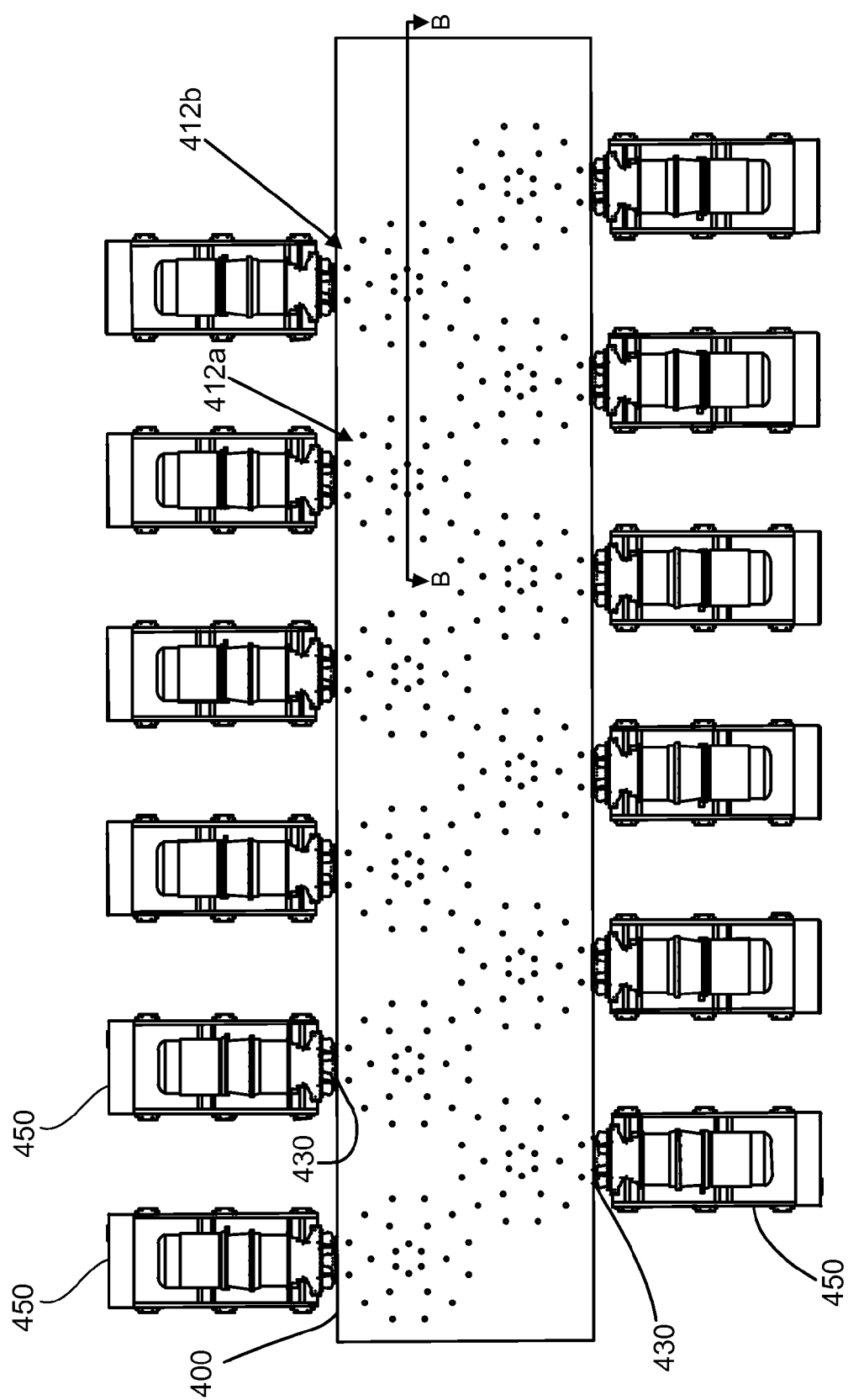
FIG. 8 is a top plan view of the apparatus of FIG. 7.
Figure 9:
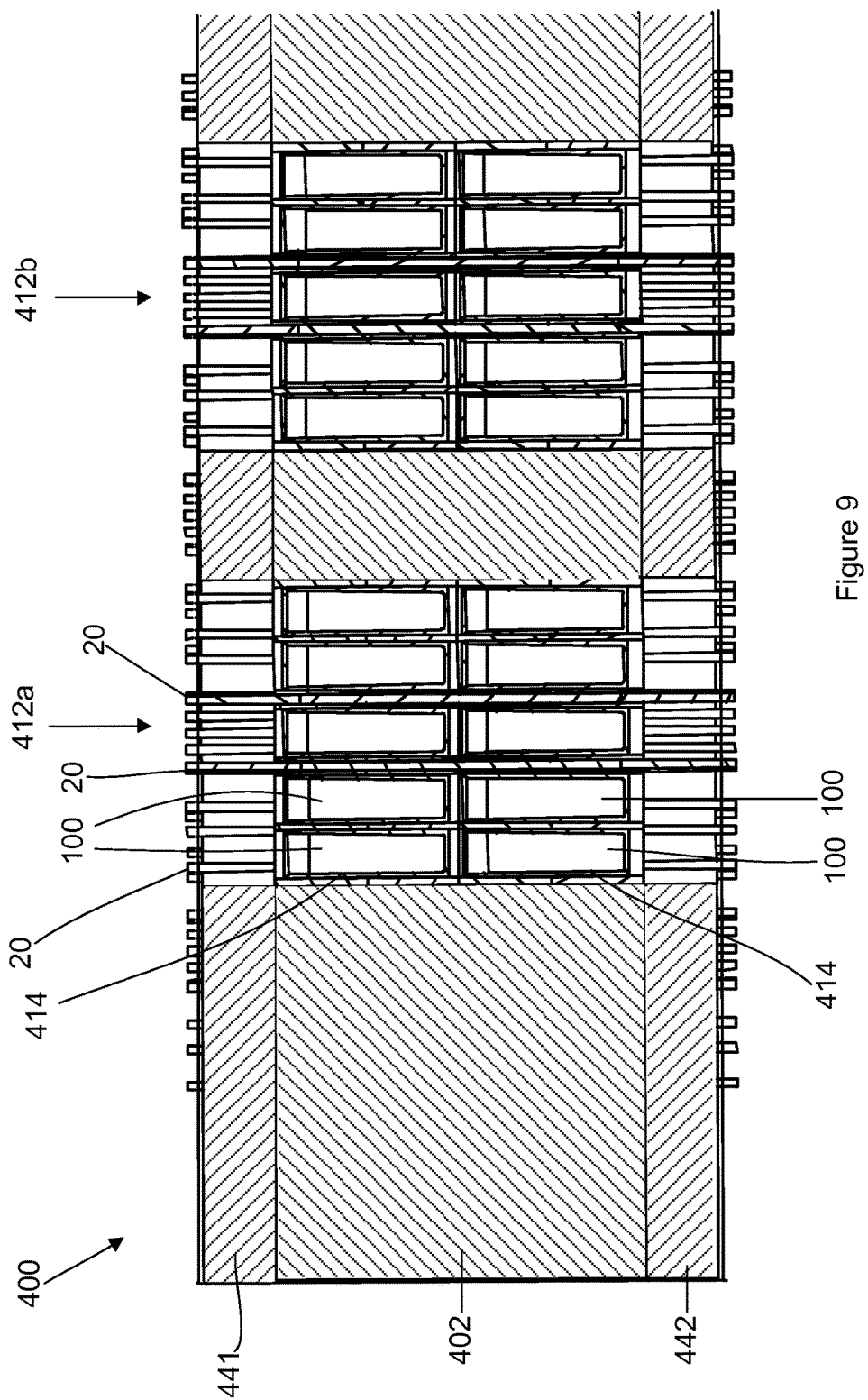
FIG. 9 is a cross-section through the line B-B of FIG. 8.

Referring now to FIGS. 7 to 9, there is shown an alternative thermal energy storage apparatus 400 which includes a contiguous block 402 of sintered graphite. The block 402 is sandwiched between upper 441 and lower 442 layers of an insulating material. The layers 441, 442 may employ different insulating materials depending on the operating temperatures experienced by the top and bottom of the apparatus 400.

The block 402 includes a plurality of heat storage regions 412 each having a plurality of holes 414 formed therein. As best shown in FIG. 9, each hole 414 receives a pair of silicon carbide containment vessels 100 of the type shown in FIGS.

2 and 3, placed one on top of the other. The containment vessels 100 each contain silicon metalloid and thereby act as heat storage elements as described above.

Each heat storage region 412 is configured similarly to the heat storage region 12 shown in FIG. 1, and includes a plurality of heating elements 20 with which may be associated temperature sensors as described above. Further, each heat storage region 412 is in thermal contact with a wick 430 for coupling to the head of a Stirling engine 450 for extracting stored heat from the system.

Fabrication of Containment Vessels

Containment vessels were fabricated starting with refractory grade silicon carbide particles having a SiC content of not less than 98% and a Fe content (in all forms, including $Fe_2O_3$) of not greater than 0.2%. The grain size of the particles was graduated from 8 US Mesh down to about −200 US Mesh. The grain sizes will generally follow a normal or an approximately normal distribution, although other non-uniform grain size distributions known in the art may also be employed.

A ceramic oxide binder was then added to the silicon carbide particles and the binder and silicon carbide mixed according to methods known in the art. The particular binder used was $Al_2O_3$, which was added to the mixture at 4% by weight. Other ceramic oxide binders, or even non-oxide binders such as silicon nitride, may of course be used, and it will be understood that the proportion of binder may be adjusted accordingly. Further, the silicon carbide particles may self-bind, so that a binder may be omitted altogether under certain circumstances.

The mixture of silicon carbide and binder was then press-moulded to form a cylinder with a tapered internal surface, as shown in FIG. 2.

The press-moulded cylinder was then placed in a kiln and sintered according to the kiln firing schedule having the sequence of steps (segments) of predetermined duration and temperature (target set point) shown in Table 1.

binder. We have also found from further testing that the phosphate binder may be omitted whilst still achieving satisfactory results.

A type R thermocouple was placed inside the sintered graphite to monitor core temperature.

Once inside the kiln, the vessels were purged with argon gas, and lids fitted to each vessel. A kiln firing sequence was then initiated to raise the kiln temperature to above 1410 degrees C., the melting temperature of the silicon metalloid. The maximum kiln temperature used in the firing sequence was 1480 degrees C.

Figure 10:
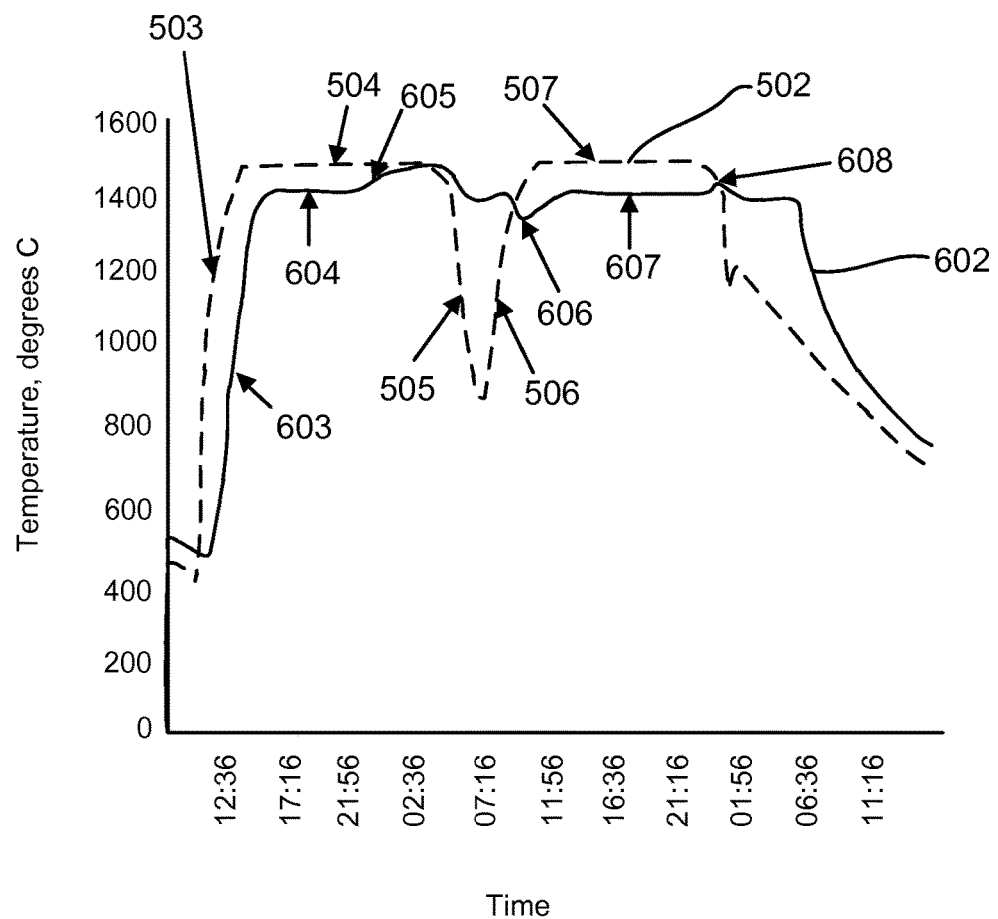
FIG. 10 shows temperature vs. time curves recorded during testing of a containment vessel.

The kiln temperature and core temperature as a function of time are shown in FIG. 10. The kiln temperature curve 502 is depicted as a dotted line, and core temperature curve 602 as a solid line.

The kiln was initially fired such that its temperature increased 503 rapidly towards a peak value of 1480 degrees C. The core temperature also increased 603 at a similar rate as the silicon metalloid absorbed energy as sensible heat, until the core temperature reached 1410 degrees C., the melting point of the silicon metalloid. The kiln temperature was then maintained 504 at 1480 degrees C. The core temperature remained 604 at 1410 degrees C., indicating that energy was being absorbed as latent heat. This continued until the core temperature began 605 to rise again, indicating that a melt fraction of 100% for the silicon metalloid had been achieved.

The kiln was then cooled 505 and then refired 506 towards a target temperature of 1480 degrees C. As a result of the cooling, the core temperature fell 606 and then rose again towards 1410 degrees C. as a result of increasing kiln temperature, indicating a return to sensible heat absorption by the silicon metalloid. The core temperature remained 607 at 1410 degrees C. while the kiln temperature was maintained 507 at 1480 degrees C. The core temperature eventually rose 608 again, once again indicating that a 100% melt fraction had been achieved.

TABLE 1

| kiln firing schedule | | | | | | | | | | | | | | | | |
|---|---|---|---|---|---|---|---|---|---|---|---|---|---|---|---|---|
| Segment # | 1 | 2 | 3 | 4 | 5 | 6 | 7 | 8 | 9 | 10 | 11 | 12 | 13 | 14 | 15 | 16 |
| Target Set Point | 100° C. | 300° C. | 500° C. | 800° C. | 950° C. | 1100° C. | 1425° C. | 1425° C. | 900° C. | 650° C. | 25° C. | | | | | |
| Segment time | 30 mins | 1.5 Hrs | 30 mins | 1 Hr | 1.5 Hrs | 1.5 Hrs | 1 Hr | 2 Hrs | 45 mins | 45 mins | 1 Hr | | | | | |

The particular schedule shown in Table 1 has been found suitable for forming the ceramic bond throughout the body of the sintered silicon carbide cylinder. It will be appreciated that the schedule may be varied to take into account various factors such as the particular binder used, the proportion of binder present, the distribution of silicon carbide particles, and so on. In particular, care should be taken when adjusting the target set points and durations so that the water content of the binder is kept at a level which facilitates formation of the ceramic bond. If the kiln temperature is raised too rapidly, water in the binder can be boiled out too quickly, thus compromising the strength of the finished cylinder.

Testing of Containment Vessels

Two silicon carbide containment vessels were fabricated according to the procedure described above. 18 kg of silicon metalloid ingots were placed in each vessel and the vessels then compacted in sintered graphite inside a silicon carbide muffle in a gas-fired industrial kiln. The vessels were sealed using a refractory mortar having similar composition to the material of the vessel, with the assistance of a phosphate Multiple cycles of heating and cooling were carried out in similar fashion to the above. The containment vessels were then removed from the muffle and inspected. It was found that the vessels had not suffered any damage as a result of the repeated cycles of heating and cooling.

Many modifications of the above embodiments will be apparent to those skilled in the art without departing from the scope of the present invention.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:
1. A thermal energy storage apparatus, including:
a block of a heat-absorbing material, the block being a single mass of compressed material in the form of machinable sintered graphite and having a plurality of holes machined therein; and a plurality of heat storage elements, the heat storage elements including a phase change material stored in a containment vessel;

wherein each heat storage element is in thermal contact with the block of heat-absorbing material, each storage element being received in a respective hole machined in the block, and wherein the holes are evenly spaced with predetermined intervals therebetween wherein the containment vessel storing the phase change material includes a substantially cylindrical sidewall, a first end and a second end, wherein the sidewall has a thickness which increases along the length of the sidewall from the first end to the second end, such that, on undergoing a phase change, the phase change material preferentially expands in the direction of the first end.

2. A thermal energy storage apparatus according to claim 1, wherein the block of heat-absorbing material includes a heat storage region having the plurality of respective holes formed therein, the heat storage elements being seated in the respective ones of said holes.

3. A thermal energy storage apparatus according to claim 2, wherein the predetermined intervals are chosen to optimise heat transport in the heat storage region.

4. A thermal energy storage apparatus according to claim 1, further including one or more heating elements in thermal contact with the heat storage region.

5. A thermal energy storage apparatus according to claim 4, wherein the one or more heating elements are seated in a second plurality of holes in the heat storage region.

6. A thermal energy storage apparatus according to claim 4, wherein the heating elements are electric heating elements.

7. A thermal energy storage apparatus according to claim 4, wherein the heating elements are individually controllable to supply different amounts of heat to different areas of the heat storage region.

8. A thermal energy storage apparatus according to claim 7, wherein the heating elements are controllable based on input from one or more temperature sensors associated with each of the different areas of the heat storage region.

9. A thermal energy storage apparatus according to claim 1, further including a wick in communication with the heat storage region and configured to be coupled with a closed-cycle heat engine.

10. A thermal energy storage apparatus according to claim 9, wherein the closed-cycle heat engine is a Stirling engine.

11. A thermal energy storage apparatus according to claim 1, wherein the phase change material includes silicon metalloid or a eutectic, hypereutectic or hypoeutectic silicon composition.

* * * * *